Patented Mar. 14, 1944

2,344,073

UNITED STATES PATENT OFFICE 2,344,073

METHOD OF MAKING ROOFING GRANULES

Stephen G. Wright, Chicago, Ill.

No Drawing. Application September 22, 1941,
Serial No. 411,933

7 Claims. (Cl. 25—156)

This invention relates to an improved roofing granule and more particularly to a crushed heavy ceramic granule prepared from unworked clay.

It has heretofore been the practice to make roofing granules of many various types. One type of granule in use heretofore has been that consisting essentially of clayey material. These clay-base granules consisted either of bricks or like material which had been formed and then crushed, or of natural shale rock which had been crushed.

The granules produced by crushing brick were, however, quite light and some roofing manufacturers reject them because of their lightness. Furthermore, they are quite expensive inasmuch as the brick must be specially prepared and then crushed, and, besides the expense of manufacturing, there is considerable loss of material on crushing.

Naturally shale rock is unsatisfactory because the edges of the material round off during granulation and the rounded granules do not adhere well to the roofing material.

By means of the present invention it has been made possible to produce a clay-base granule at considerably less expense than is characteristic of crushed brick granules and at the same time having a high density. Furthermore, by means of the present process a clay-base granule may be produced with a surface coating of pigment bonded thereto solely by the natural affinity of the pigment for the clay.

In the manufacture of roofing granules of the present invention any suitable clay is broken, without working, into lumps suitable in size so that in the heating process employed a temperature of at least 1200° F. will be produced throughout the entirety of the lump. These lumps are then partially baked at a temperature which should not substantially exceed 1500° F. for any substantial period. Overbaking a small proportion of the material in the lump, however, will not seriously detract from the produce but nevertheless is not desired. The use of temperatures which are too high produces a brittle product. Temperatures much below 1400° F. will not produce a suitable product in an economical length of time with ordinary clays.

The product when baked under these conditions is quite dense compared with ordinary brick material. Ordinarily a heating time of only 30 minutes is required.

After the clay has been baked as above described, it is transferred to crushing machines of the ordinary type and is then crushed to granule size. During this crushing, the original surface of the lump substantially disappears so that practically all of the surfaces produced are new surfaces which were not exposed to the atmosphere during the baking process and are less vitreous than the outer original surface. These new freshly-formed, partially-baked surfaces have a natural affinity for pigments such as those usually used in the roofing granule industry. Granules may be colored any suitable color by admixture of a small proportion of a suitable mineral pigment such as iron oxide, chrome oxide, cobalt oxide, or other heat-stable, weather-stable pigment.

For example the granules may be colored red by adding approximately 25 lbs. of powdered iron oxide to 1 ton of the freshly prepared granules, suitably mixing the two products either by wetting or otherwise and then baking at approximately 1800 F. for a few minutes. The iron oxide adheres without binder to the freshly formed surfaces and produces a permanently colored granule of any desired shade, depending on the proportion added. Mixed pigments may also be used.

Certain natural clays do not require any pigment. Ordinary underlay clay which usually contains a small amount of carbonaceous material does not require any pigment. Ordinary underlay clay, which usually contains a small amount of carbonaceous material, will produce a color ranging from creamy white to buff upon second burning. If, however, a small amount of any suitable alkali metal salt is added to the granules before burning, the color is intensified. A suitable amount is 20 to 50 lbs. per ton of granules. This may be applied in powdered form to wet granules or may be dissolved in water and applied to dry granules. The whole range of permanent ceramic colors is obtainable by this process. White may be produced by adding china clay or titanium oxide. Red may be produced by the use of iron oxide. Green may be produced by the use of copper or chromium oxides, and blue by the use of cobalt oxide. These are preferably applied by wetting the granules before applying the material.

The granules produced by this method have sharp corners, and have a considerably higher density than crushed brick granules. Owing to the fact that only a surface pigment is used, the requirements of pigment are low. Furthermore the absence of binder or glaze promotes the adherence of the granules to the ordinary asphalt type roofing.

If glazed or partially glazed granules are desired, any of the well known glazing materials such as sodium, potassium, lead, or boron salts, may be used in the normal manner.

The foregoing detailed description has been given for clearness of understanding only, and no unnecessary limitations should be understood therefrom.

What I claim as new and desire to secure by Letters Patent is:

1. The method of forming a roofing granule which comprises partially baking natural clay in lumps to produce a temperature of at least 1200° F. in the clay, fracturing the partially baked lumps into granules of a suitable size for roofing, and completing the baking of the granules.

2. The method as set forth in claim 1, in which the first baking is carried on to produce at least a temperature of 1200° F. in the clay, and the second baking is at a temperature of approximately 1800° F.

3. The method of forming a roofing granule which comprises partially baking natural lumps of clay, fracturing the partially baked lumps into granules having substantially entirely fresh unbaked surfaces, coating the partially baked granules with a mineral coloring matter without any substantial quantity of adhesive, and completing the baking.

4. The method as set forth in claim 1, in which the granules are provided with a pigment.

5. The method as set forth in claim 1, in which the granules are provided with a pigment adhering thereto solely by natural adhesion.

6. The method as set forth in claim 1, in which the granules are treated with an alkali metal salt.

7. The method as set forth in claim 1, in which the granules are treated with a glazing compound.

STEPHEN G. WRIGHT.